United States Patent
Englert et al.

(10) Patent No.: US 10,131,747 B2
(45) Date of Patent: Nov. 20, 2018

(54) POLY(ETHYLENE IMINE)-BASED COPOLYMERS FOR BONDING TO AND RELEASING GENETIC MATERIAL, IN PARTICULAR DNA/RNA, AND METHOD FOR THE PRODUCTION AND USE OF SAME

(71) Applicant: SmartDyeLivery GmbH, Jena (DE)

(72) Inventors: Christoph Englert, Jena (DE); Lutz Tauhardt, Jena (DE); Michael Gottschalk, Jena (DE); Ulrich S. Schubert, Jena (DE)

(73) Assignee: SMARTDYELIVERY GMBH, Jena (DE)

( * ) Notice: Subject to any disclaimer, the term of this patent is extended or adjusted under 35 U.S.C. 154(b) by 21 days.

(21) Appl. No.: 15/026,882

(22) PCT Filed: Oct. 2, 2014

(86) PCT No.: PCT/DE2014/000500
§ 371 (c)(1),
(2) Date: Apr. 1, 2016

(87) PCT Pub. No.: WO2015/048940
PCT Pub. Date: Apr. 9, 2015

(65) Prior Publication Data
US 2017/0166697 A1   Jun. 15, 2017

(30) Foreign Application Priority Data
Oct. 2, 2013   (DE) .......................... 10 2013 016 750

(51) Int. Cl.
*C08G 73/02* (2006.01)
*C08G 81/00* (2006.01)

(52) U.S. Cl.
CPC ..... *C08G 73/0233* (2013.01); *C08G 73/0206* (2013.01); *C08G 73/0213* (2013.01); *C08G 81/00* (2013.01)

(58) Field of Classification Search
CPC ............ C08G 73/0206; C08G 73/0213; C08G 73/0233; C08G 81/00
See application file for complete search history.

(56) References Cited

U.S. PATENT DOCUMENTS

| | | | |
|---|---|---|---|
| 3,251,778 A | 5/1966 | Dickson et al. | |
| 2004/0018357 A1* | 1/2004 | Andre ................ | C08G 73/0233 428/357 |
| 2004/0248842 A1 | 12/2004 | Wagner et al. | |
| 2008/0112916 A1 | 5/2008 | Wagner et al. | |
| 2009/0215166 A1 | 8/2009 | Goepferich et al. | |
| 2013/0075665 A1 | 3/2013 | Park et al. | |

FOREIGN PATENT DOCUMENTS

| | | |
|---|---|---|
| DE | 197 26 186 | 12/1998 |
| DE | 201 22 328 | 2/2006 |
| EP | 2 586 815 | 5/2013 |
| JP | 2005-137253 | 6/2005 |
| WO | WO-2007/084797 | 7/2007 |
| WO | WO-2009/102952 | 8/2009 |
| WO | WO-2011/162366 | 12/2011 |
| WO | WO-2012/057628 | 5/2012 |

(Continued)

OTHER PUBLICATIONS

Christoph Englert et al: "Linear Poly(ethylene imine)-Based Hydrogels for Effective Binding and Release of DNA", Biomacromolecules, vol. 15. No. 4, Apr. 14, 2014 (Apr. 14, 2014), pp. 1124-1131, XP055164820 Abstract.

(Continued)

*Primary Examiner* — Robert S Jones
(74) *Attorney, Agent, or Firm* — Abel Law Group, LLP

(57) ABSTRACT

New poly(ethylene imine)-based copolymers for bonding to and releasing genetic material, in particular DNA/RNA, and method for the production and use of same.

The copolymers according to a compound of the general Formula I:

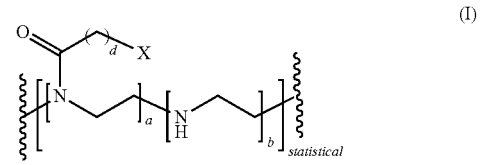

(I)

can be produced at low costs and with little expenditure of time, are tailor-made and have a high functionality for universal effective uses without restriction of their bonding affinity to genetic material.

The new copolymers are produced through a synthesis of the general Formula III:

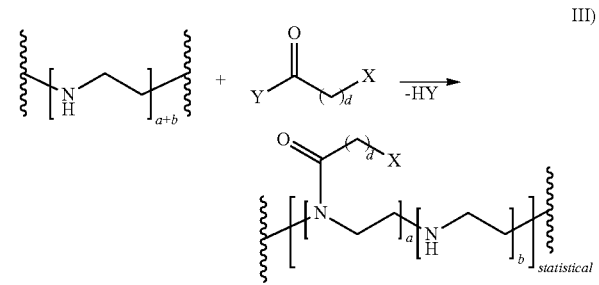

(III)

25 Claims, 2 Drawing Sheets

(56) References Cited

FOREIGN PATENT DOCUMENTS

| | | |
|---|---|---|
| WO | WO-2012/149591 | 11/2012 |
| WO | WO-2013/137736 | 9/2013 |

OTHER PUBLICATIONS

Surendra Nimesh, et al., "Influence of acyl chain length on transfection mediated by acylated PEI nanoparticles", International Journal of Pharmaceutics 337 (2007) 265-274.

Huayu Tian, et al.; "N-Isopropylacrylamide-Modified Polyethylenimines as Effective Gene Carriers"; Macromolecular Bioscience, 2012, 12, 1680-1688.

* cited by examiner

POLY(ETHYLENE IMINE)-BASED COPOLYMERS FOR BONDING TO AND RELEASING GENETIC MATERIAL, IN PARTICULAR DNA/RNA, AND METHOD FOR THE PRODUCTION AND USE OF SAME

The invention relates to new polyethylene imine)-based copolymers which consist of ethylene imine and 2-oxazoline units, but compared to known poly(ethylene imine)-based copolymers (PEI) they have a surprisingly high level of functionality. PEIs of this type are known for bonding to and releasing DNA/RNA. Furthermore, the invention also includes the method for their preparation as well as the function-specific uses of the proposed copolymers.

The proposed poly(ethylene imine)-based copolymers can be used, for example, for functionalizing surfaces, developing DNA chip systems for mobile analytics and as materials for antifouling coatings of sensors.

2-(3-butenyl)-2-oxazoline is already known as a monomer (A. Gress, A. Völkel, H. Schlaad; Thio click modification of poly[2-(3-butenyl)-2-oxazoline] Macromolecules 40, 2007, 7928-7933), which is produced by the functionalization of (2-chloroethylamine)-hydrochloride with N-succinimidyl-4-pentenate, followed by a ring closure. The monomer 2-(3-butenyl)-2-oxazoline produced in three steps is polymerized to poly(2-(3-butenyl)-2-oxazoline). The homopolymer obtained in a comparatively time-consuming process does not contain free amine groups which are required for bonding to genetic material, in particular DNA/RNA.

Poly(ethylene imine)-based copolymers for which the functionalization with N-isopropylacrylamide is realized by a so-called Michael reaction are also known (H. Tian, F. Li, J. Chen, Y. Huang, X. Chen: N-Isopropylacrylamide-modified Polyethyleneimines as Effective Gene Carriers, Macromolecular, Bioscience 12, 2012, 1680-1688). These synthesized derivatives show bonding affinity to plasmid DNA. However, the functionalization of the PEI by means of said Michael reaction leads to side chains without possible multiple bonds so that the functionalization is limited. In particular, it is not possible in this manner to produce substrates with functionalized surface or structured hydrogels, for example for beads, particles etc., for the bonding and release of genetic material.

It is also known that under mild conditions, N-hydroxysuccinimide (NHS) or the slightly more polar N-hydroxysuccinimide (NHS) react with carboxyl-containing components (e.g. butanoic acid) to so-called "aminoacyl esters" (D. Sehgal, I. K. Vijay: A method for the high efficiency of water-soluble carbodiimide-mediated amidation, Anal. Biochem. 218, 1994, 87-91).

By means of these aminoacyl esters, amine groups can be functionalized, but this functionalization is limited exclusively to primary amine groups. Moreover, the introduction of functionalized side chains in polymers is not mentioned. As written above, multiple bonds are not possible here either, so that once again substrates with functionalized surface or structured hydrogels, for example for beads, particles, etc., cannot be produced to bond to and release genetic material, in particular DNA/RNA.

Furthermore, the functionalization of branched PEI with acetate, butanoate and hexanoate by EDAC/NHS is known (A. M. Doody, J. N. Korley, K. P. Dang, P. N. Zawaneh, D. Putnam: Characterizing the structure/function parameter space of hydrocarbon-conjugated branched polyethylenimine for DNA delivery in vitro, J. Control. Release 116, 2006, 227-237). As mentioned before, the functionalization is again exclusively limited to primary amino groups. In addition, the functionalization of polyethylene imine by acetic, propionic and butanoic acid anhydride is described (S. Nimesh, A. Aggarwal, P. Kumar, Y. Singh, K. C. Gupta, R. Chandra: Influence of acyl chain length on transfection mediated by acylated PEI nanoparticles, Int. J. Pharm. 337, 2007, 265-274). In both cases, bonding affinity to genetic material such as DNA/RNA exists, but again multiple bonds of the introduced side chains are not mentioned, and thus the disadvantages of the limited use functionality described above also exist.

Moreover, polyalkyleneimine hydrogels with tunable degradation rates are known (M. Carnahan, J. Butlin: Cross-linked Polyalkyleneimine Hydrogels with Tunable Degradation Rates, WO 2009/102952 A2). Here, differently functionalized polyalkyleneimines the reaction process of which is not demonstrated, or branched polyethylene imine, are crosslinked by means of activated polyethylene glycol, so that only a part of the original amine groups of the PEI is available for future biological application. The degree of crosslinking is only controlled indirectly via the ratio of the amounts of the starting polymer and the crosslinking agent. In this process, the focus is on the synthesis of hydrogel networks. The subsequent use of existing functionalities, for example on surfaces or for the synthesis of structured hydrogels for bonding to and releasing genetic material, is not further discussed.

In addition, the partial alkaline hydrolysis of poly(N-acetyl ethylene imine) is known (Y. Chujo, Y. Yoshifuji, K. Sada, T. Saegusa: A Novel Nonionic Hydrogel from 2-2-methyl-2-oxazoline, Macromolecules 22, 1989, 1074-1077). Subsequent crosslinking to polymer networks is, as already described above, only possible via existing ethylenimine units. These are no longer available for bonding to and later releasing genetic material. Free ethylenimine units cannot be exactly quantified in the prepared hydrogel. Moreover, the introduction of functionalized side chains in the polymers is not mentioned, thus ruling out the applications, for example a surface functionalization. An introduction of side chains with unsaturated functionalities cannot be performed in a hydrolysis process.

The alkylation acylation of polyethylene imines and the analysis of the release of plasmid DNA from these copolymers are well-known (M. Thomas, A. M. Klibanov: Enhancing polyethylenimine's delivery of plasmid DNA into mammalian cells, PNAS 99, 2002, 14640-14645). Here again, the introduction of unsaturated functional groups and the possibility of converting the copolymers to hydrogels by means of crosslinking agents are not mentioned.

Furthermore, the partial acetylation of polyethylene imine via acetic anhydride is specifically analyzed in detail (M. L. Forrest, G. E. Meister, J. T. Koerber, D. W. Packl: Partial Acetylation of Polyethylenimine Enhances In Vitro Gene Delivery, Pharm. Res. 21, 2004, 365-371). Due to the absence of multiple bonds in the side chains, the disadvantages of the limitation of possible uses described above also exist.

The functionalization and crosslinking of branched polyethylene imine with mono-, bi- or multi-functional components are mentioned, too. (P. Tarcha, T. Merdan, E. Wagner, J. Klöckner: Chemically modified polycation polymer for siRNA delivery, WO 2007/084797). The possibility of introducing unsaturated functional groups by means of a Michael reaction is mentioned, but a practical implementation is not further described. Accordingly, here too, no reference is made to a possible application of these polymers for surface functionalization or structuring of hydrogels, for example for beads, particles, etc., for bonding to and releasing genetic material, in particular DNA/RNA. In addition, existing potential ethylenimine units are connected within a copolymer through a crosslinking agent.

The functionalization with long-chain acid halogenides is also known (L. Yan, W. T. S. Huck, X. -M. Zhao, G. M. Whitesides: Patterning Thin Films of Poly(ethylene imine) (L. Van, W T S Huck. X. -M Zhao, G M Whitesides. Patterning Thin Films of poly (ethylene imine) on a Reactive SAM Using Microcontact Printing, Langmuir 15, 1999, 1208-1214) but it is again combined with the disadvantage of the missing multiple bond in the side chain and the related application possibilities.

The synthesis of water-soluble copolymers of diverse composition is known (WO 2011/162366 A1). The introduction of multiple bonds in branched polyethylene imine is described only in the context of ethylene glycol units in the side chain, the objective of which is the synthesis of water-soluble polymers. A chemical bonding of genetic material is extremely limited by the percentagewise decreased density of positive charges, particularly for long side chains. The desired solubility characteristic is especially achieved by a high number of ethylene glycol units, which, however, make a bonding, in particular of DNA, difficult. To be able, nevertheless, to observe the most efficient bonding of genetic material, the ethylene imine proportion in the copolymer must reach a certain magnitude. When starting from this composition, however, water solubility is no longer possible. An application of these unsaturated, functionalized copolymers, for example for the structuring of hydrogels, is not mentioned.

Furthermore, the partial hydrolysis of poly(2-oxazolines) is known (F. Wiesbrock, F. Stelzer, C. Slugovic, N. Noormofidi, V. Kaltenhauser, Kreutzwiesner, K. Rametsteiner: Use of contact biocides based on poly(2-substituted) oxazolines, WO 2012/149591). The synthesis of a multiple-bond-containing copolymer is not possible using this reaction method. A hydrolysis leads to the destruction of the multiple bond functionality under the required conditions.

Therefore, the object of the invention is to create new poly(ethylene imine)-based copolymers which can be produced at low costs and with little expenditure of time, are tailor-made and have a high functionality for universal effective uses, but this without limitation of their ability to bond to genetic material, in particular DNA/RNA.

DETAILED DESCRIPTION OF THE INVENTION

Figure 1:
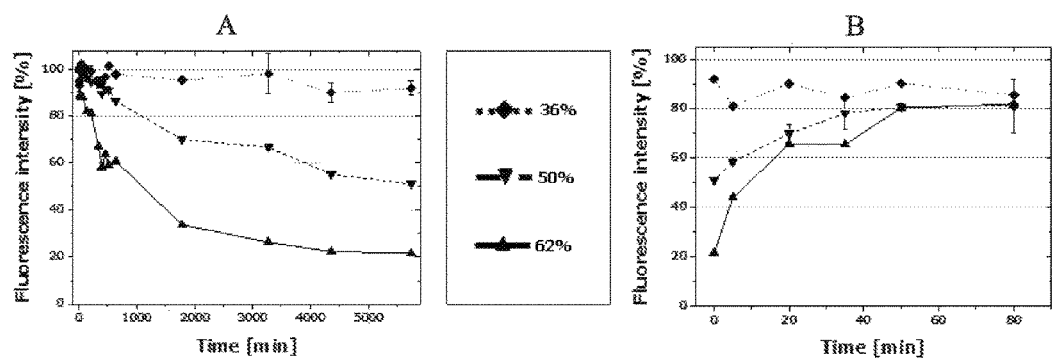
FIG. 1: Schematic representation of the bond (A) and release (B) of genomic herring DNA from hydrogels with varying PEI content by means of EB (ethidium bromide) tests.

For example, it shall be possible to produce hydrogels from the poly(ethylene imine)-based copolymers with high bonding affinity to DNA/RNA.

This objective is achieved by new poly(ethylene imine)-based copolymers for bonding to and releasing genetic material, in particular DNA/RNA, consisting of ethylene imine and 2-oxazoline units, having a compound of the general Formula I:

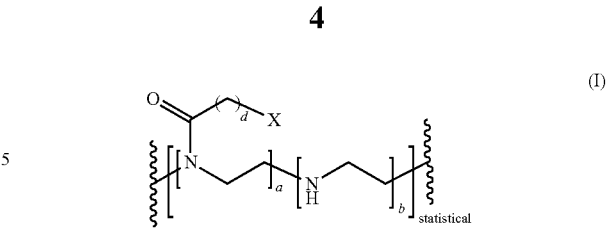

with:
a,b: proportion of the respective monomer units (a, b>0)
d: length of the side chain (1 to 20)
X: functional group of the 2-oxazoline unit (via double or triple bond) copolymer chain length of between 2 and 1000000 units Here, it is advantageous if these new poly(ethylene imine)-based copolymers have different oxazoline units according to the general Formula II:

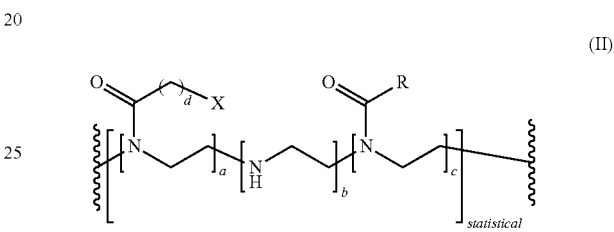

with:
a, b, c: proportion of the respective monomer units (a, b, c>0)
d: length of the side chain (1 to 20)
X: functional group of the 2-oxazoline unit (via double or triple bond)
R: H or organic residue (e.g. alkyl and aryl residue), copolymer chain length of between 2 and 1000000 units The composition of the tailored copolymers can be determined in a simple and fast manner by means of nuclear magnetic resonance spectroscopy. The structure of the new copolymers allows multiple bonds in the copolymer backbone and thus creates conditions for functionalities without limiting the bonding affinity to genetic material compared to the prior art. Thus, said functionalities allow further applications in which the bonding/release, in particular to/of DNA, and RNA, is fully supported. It is possible, for example, to add a further component to the copolymer described by means of click-chemistry known per se (thiol-ene photo addition, azide click). The great advantage of the copolymer produced is that this reaction does not affect existing and accurately quantified amino groups. Thus, their affinity for bonding to and releasing genetic material also remains unaffected and can still be influenced by adjusting the PEI content in the copolymer. The focus continues to be on the introduction of short, simple side chains which have no influence on a biological application and thus permit quantitative statements about the bonding to genetic material.

In the dependent claims, specific uses of the proposed copolymers on the basis of their functionalities described above are indicated. The copolymers may, for example, be applied to functionalized surfaces and enable a bonding to and release of genetic material in these surfaces. Due to the incomplete surface bonding, free multiple bonds are present and can be used for the gradual production of hydrogel layers on the desired surface. A further advantage is the possibility of structuring three-dimensional polymer networks, so-called hydrogels. With the aid of a bifunctional linker (dithiol), the copolymers can be crosslinked to such hydrogels. A decisive disadvantage of such polymer networks is their absolute insolubility in all solvents. Therefore, it is not possible to determine the defined PEI content in the gel structure by means of (solution) nuclear magnetic resonance spectroscopy (as is the case for the copolymers). However, on the basis of the characterization of the copolymer mentioned above and the subsequent crosslinking via the unsaturated functionalities (amino groups remain unaffected) an exact statement can be made about the PEI proportion contained in the hydrogel.

The easy and quick implementation of, for example, the thiol-ene photo addition by irradiating the sample with UV light (365 nm) also leads to the possibility of producing customized hydrogel heads in situ. Here, too, genetic material can be selectively bound and released.

According to the invention, the new poly(ethylene imine)-based copolymers are produced by a synthesis of the general Formula III:

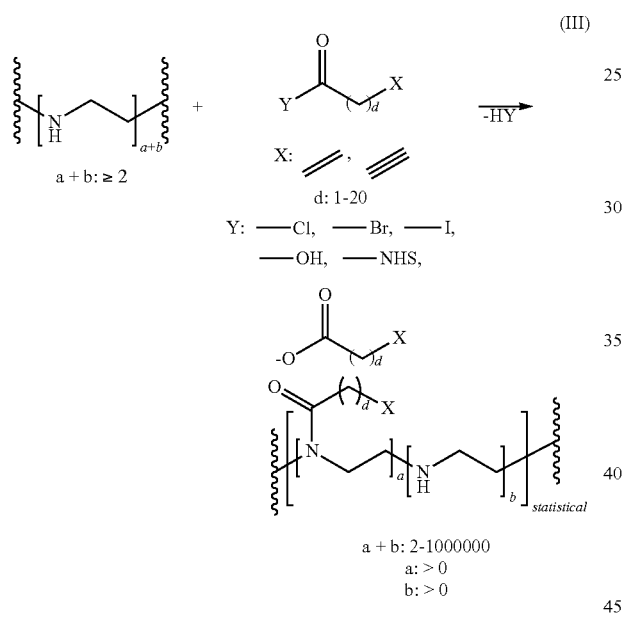

It is advantageous if, in the case of —OH or —NHS as acid, the functionalization is introduced in the presence of an activating agent, in particular EDC (1-ethyl-3-(3-dimethylaminopropyl) carbodiimide) or DCC (dicyclohexylcarbodiimide).

However, it is also possible to introduce the functional side chain via a later functionalization by means of unsaturated acid anhydrides or acid halogenides (—Cl, —Br, —I).

Due to their synthesis process, the copolymers of the invention have both unsaturated functionalities and free amino groups. According to the invention, the synthesis of a copolymer of Formula I or II, for example, is based on a subsequent functionalization of the homopolymer polyethylene imine (Formula III).

The synthesis method allows a time-saving and technically simple process implementation at low costs, which is possible both on a small scale and in high-throughput technologies. The production of tailor-made copolymers leads to substances with precisely defined compositions, which can be varied depending on the specific application purpose. Their exact composition can be determined in a simple and fast way using nuclear magnetic resonance spectroscopy. Thus, it is possible to create extensive libraries of copolymers of different composition through the simple variation of the precursor quantities.

The invention will be described in detail by means of various embodiments.

EXAMPLE 1

Synthesis of hydrogels with precisely adjustable PEI proportion (for the later bonding to and release of genomic herring DNA), with the copolymers being crosslinked via photo-initiated thiol-ene photo addition analogous to Dargaville (TR Dargaville et al.: poly (2-oxazoline) hydrogel monoliths is carried out via thiol-ene coupling. Macromol. Rapid Commun. 33, 2012 695-700).

The following formula shows the schematic production of the thiol-ene photo addition of P(ButEnOx-co-E1) with 2,2'-(ethylenedioxy) diethanthiol in the presence of the catalyst DMPA under UV light (365 nm).

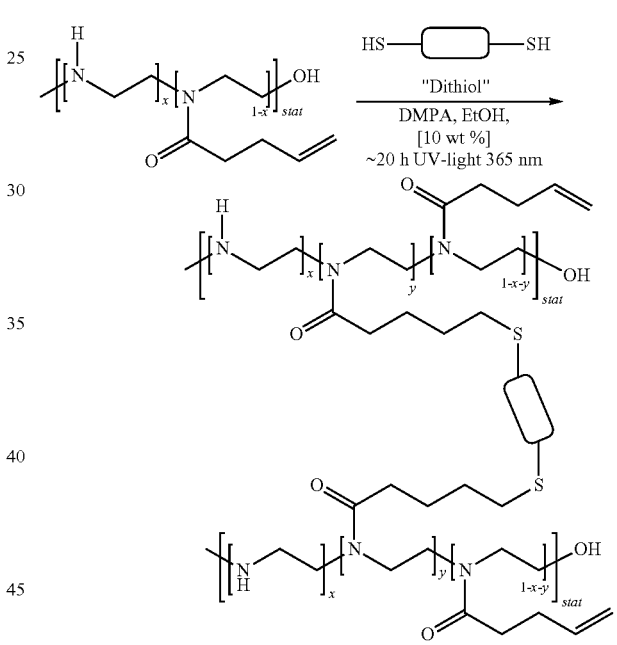

Poly[2-(3-butenyl)-2-oxazoline-co-ethylenimine]-based hydrogels:

In a microwave vial, the copolymer P(ButEnOx-co-EI) was dissolved in ethanol. In a second vial, the photoinitiator 2,2-dimethoxy-2-phenylacetophenone and the bifunctional thiol, 2,2-(ethylenedioxy) diethanethiol, were dissolved, also in ethanol (0.9: 1.0 thiol: double bond), The combined, clear solutions (10 wt%) were degassed with nitrogen for 30 minutes and then exposed to UV light (365 nm) for approximately 24 hours, The beginning gel formation showed the successful hydrogel synthesis. The resulting gel was washed repeatedly with methanol and water. This process was followed by freeze-drying, It was possible to create a library of various hydrogels starting from appropriate copolymers. It was also possible to characterize the synthesized substances extensively (source value, vapor TGA, FT—IR, EA, solid $^1$H-/$^{13}$C—NMR, SEM).

DNA studies—ethidium bromide test of P(ButEnOx-co-EI)-based hydrogels:

The hydrogels were swollen in HBG buffer (pH 7) for 24 hours. Subsequently, a genomic DNA ethidium bromide solution was added. At defined times, one aliquot at a time was removed and, after measuring the fluorescence, it was pipetted back. The targeted release of previously bound DNA ts achieved within a very short, time by the addition of a heparin solution and a temperature increase to 70° C.

Results:

Gelation occurs only below a PEI content of 75%.

Apart from their expected insolubility, the hydrogels exhibit typical swelling behavior in water, which is highly dependent on the PEI content and the degree of crosslinking (amount of dithiol) of the gels, as illustrated in FIG. 1. The DNA bonding and release capacity depends on the PEI proportion within the hydrogel structure. In addition to a temperature increase, the presence of heparin is also required for the controlled release. The DNA will be almost completely released again within a very short time (<60 min).

EXAMPLE 2

Formulation of hydrogel beads via thiol-ene photo addition analogous to a suspension polymerization.

An extreme increase in surface area and hence a more effective DNA bonding is reached with the production of the proposed new copolymers as hydrogel heads. Moreover, it is possible to adjust beads to precisely defined sizes by changing the reaction conditions.

P(ButEnOx-co-EI)-based hydrogel beads:

The copolymer P(ButEnOx-co-EI$_{50\%}$) was used as starting material. This copolymer and an appropriate amount of the catalyst DMPA were dissolved in ethanol (8 wt%) and then the dithiol 2,2'-(ethylenedioxy)diethanethiol was added. By the addition of paraffin oil and the stabilizer Span®80 a two-phase mixture was produced. After 25 min of degassing with N-$_2$, the thiol-ene photo addition was carried out by stirring (375 rpm) at room temperature and with UV-radiation (365 nm). After 2.5 h, the resulting hydrogel was separated and washed intensively with ethanol and water. Subsequently, the gel was swollen for six hours and freeze-dried in water.

EXAMPLE 3

Addition of monolayers on functionalized glass surfaces via thiol-ene photo addition and the gradual production of covalently hound hydrogel layers.

Figure 2:
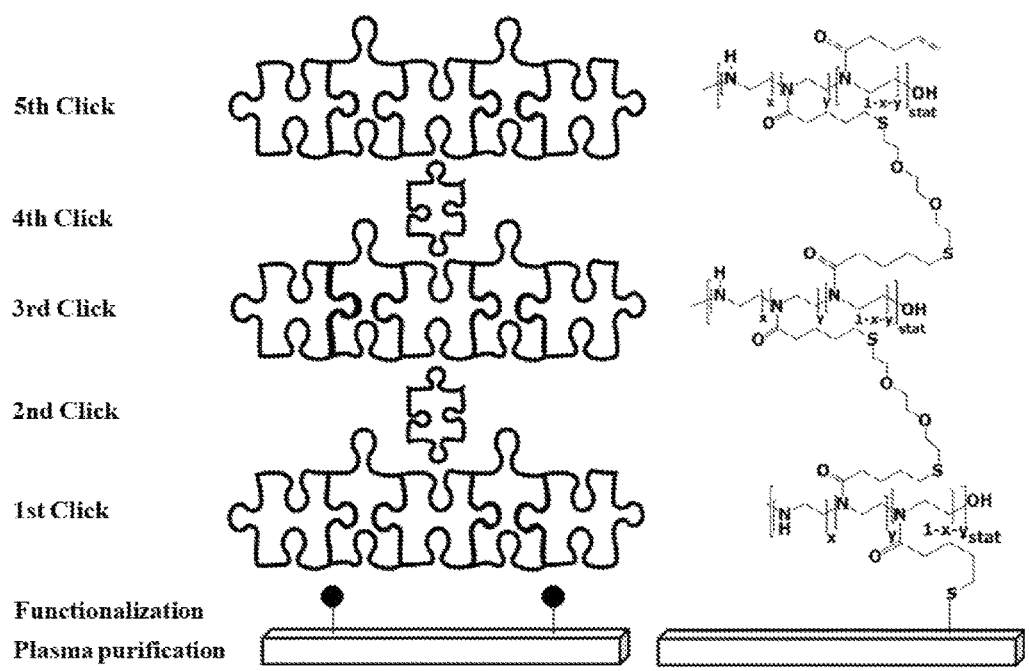
FIG. 2: Overview of addition of monolayers on functionalized glass surfaces via thiol-ene photo addition and the gradual production of covalently bound hydrogel layers.

The covalent bonding of the proposed new copolymers to thiol-functionalized surfaces makes the effective DNA bonding to and release from surfaces possible. By integrating the dithiol mentioned above, hydrogel layers which have different DNA affinity, depending on the layer thickness, can be built up gradually (see FIG. 2, Overview 1). This application of bonding to and releasing genetic material, in particular DNA/RNA, from coated surfaces will be used, for example, in mobile analytics (chip diagnostics).

In a conical microwave vial, the copolymer P(ButEnOx-co-EI$_{50\%}$) and the photoinitiator 2,2-dimethoxy-2-phenylacetophenone were dissolved together in ethanol. A 1×1 cm² glass plate previously baked out in a plasma furnace and functionalized with 3-(trimethoxysilyl)-1-propanethiol was placed so that stirring with a magnetic stir bar was still possible below the inserted glass plate. The vial was degassed with nitrogen for 30 minutes and then exposed to UV light (365 nm) for approximately 24 hours. The coated glass surface 1$^{st}$ click) was repeatedly washed with water and methanol. The 2$^{nd}$ click was carried out in an analog manner by adding the crosslinker 2,2'-(ethylenedioxy)diethanethiol instead of the copolymer. The above mentioned washing steps were carried out again. The repeated reaction with the described copolymer (3$^{rd}$ click) resulted in the formal creation of the hydrogel layer. Due to the presence of free double bonds, the layered structure could be built up step by step until the 7$^{th}$ click, and even many more layers are possible.

It is possible to show the successful coating of the glass surfaces using fluorescence microscopy. For this purpose, the copolymer described above was marked with fluorescein dye (~1%), and then the copolymer marked in this manner was added to the surface for detection (click step). The treated surface showed, even after extensive washing, a successful covalent bonding by an increased fluorescence of the marked sample compared to a dye-free coating. Measurements of a scratch on the coated surfaces by means of an atomic force microscope showed a thickness of 15 nm for the first layer (1$^{st}$ click). For the formation of a hydrogel layer (3$^{rd}$ click), a height of 35 nm could be determined. Moreover, successful bonding could be shown by using infrared spectroscopy.

The invention claimed is:

1. A poly(ethylene imine)-based copolymer comprising ethylene imine- and 2-oxazoline units, being represented by general Formula I:

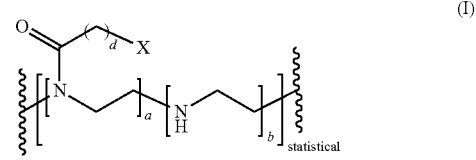

wherein:
a and b represent the proportion of the respective monomer units;
a and b>0;
d represents the length of the side chain and is from 1 to 20:
X is selected from the following functional groups:

a+b is from 2 and to 1000000.

2. A poly(ethylene imine)-based copolymer comprising ethylene imine- and 2-oxazoline units, being represented by general Formula II:

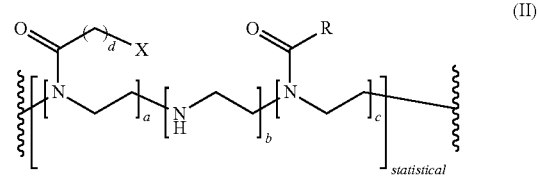

wherein:
a, b, and c represent the proportion of the respective monomer units;

a, b, and c>0;
d represents the length of the side chain and is from 1 to 20;
X is selected from the following functional groups:

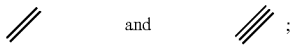

R is H or an organic residue; and
a+b is from 2 to 1000000.

3. A method for producing a poly(ethylene imine)-based copolymer comprising a synthesis of general Formula III:

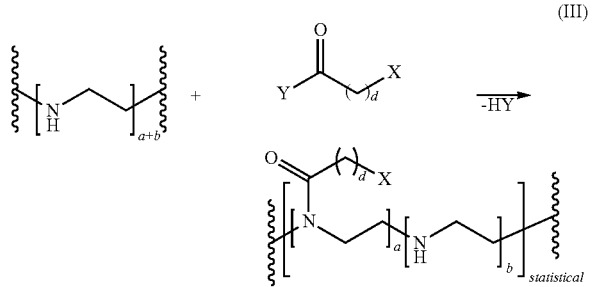

wherein:
a>0;
b>0;
a+b of the formed copolymer is from 2 to 1000000;
X is selected from the following functional groups:

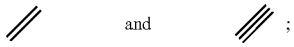

d is from 1 to 20; and
Y is selected from —Cl, —Br, —I, —OH, —NHS and

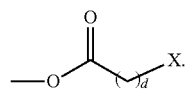

4. The method according to claim 3, wherein Y is —OH or —NHS, and the synthesis takes place in the presence of 1-ethyl-3-(3-dimethylaminopropyl) carbodiimide or dicyclohexylcarbodiimide as an activating agent.

5. The method according to claim 3, further comprising providing functional side chains on the poly(ethylene imine)-based copolymer by a subsequent functionalization by means of an unsaturated acid anhydride or an unsaturated acid chloride, bromide or iodide.

6. The poly(ethylene imine)-based copolymer according to claim 2, wherein the organic residue R is an alkyl or an aryl group.

7. A method of releasably bonding genetic material, comprising contacting the genetic material with the poly (ethylene imine)-based copolymer of claim 1, whereby the genetic material is releasably bonded to the poly(ethylene imine)-based copolymer.

8. The method according to claim 7, wherein the poly (ethylene imine)-based copolymer is crosslinked via the functional group at the X position of Formula I with a cross-linking agent and forms a hydrogel.

9. The method of claim 7, wherein the poly(ethylene imine)-based copolymer is crosslinked via the functional group at the X position of Formula I with a cross-linking agent and forms beads or particles.

10. The method of claim 7, wherein the poly(ethylene imine)-based copolymer is attached to a surface of a substrate by a covalent bonding.

11. The poly(ethylene imine)-based copolymer of claim 1, wherein the poly(ethylene imine)-based copolymer is adapted for releasably bonding a genetic material.

12. The poly(ethylene imine)-based copolymer of claim 11, wherein the genetic material comprises DNA, RNA, or a combination thereof.

13. The poly(ethylene imine)-based copolymer of claim 12, wherein the DNA includes plasmid DNA.

14. A crosslinked poly(ethylene imine)-based copolymer, wherein the poly(ethylene imine)-based copolymer of claim 1 is crosslinked with a crosslinking agent involving the functional group at the X position of Formula I.

15. The crosslinked poly(ethylene imine)-based copolymer of claim 14, wherein the crosslinking agent is a bifunctional thiol.

16. A hydrogel comprising the crosslinked poly(ethylene imine)-based copolymer of claim 14.

17. A bead comprising the crosslinked poly(ethylene imine)-based copolymer of claim 14.

18. A substrate comprising the poly(ethylene imine)-based copolymer of claim 1 attached to an outer surface of the substrate by a covalent bonding, the covalent bonding formed with the functional group at the X position of Formula I.

19. The substrate of claim 18, wherein a material of the substrate includes glass.

20. The substrate of claim 18, adapted for releasably bonding a genetic material.

21. A crosslinked poly(ethylene imine)-based copolymer, wherein the poly(ethylene imine)-based copolymer of claim 2 is crosslinked with a crosslinking agent involving the functional group at the X position of Formula II.

22. A hydrogel comprising the crosslinked poly(ethylene imine)-based copolymer of claim 21.

23. A bead comprising the crosslinked poly(ethylene imine)-based copolymer of claim 21.

24. A substrate comprising the poly(ethylene imine)-based copolymer of claim 2 attached to an outer surface of the substrate by a covalent bonding, the covalent bonding formed with the functional group at the X position of Formula II.

25. The substrate of claim 24, adapted for releasably bonding a genetic material.

* * * * *

UNITED STATES PATENT AND TRADEMARK OFFICE
CERTIFICATE OF CORRECTION

PATENT NO. : 10,131,747 B2
APPLICATION NO. : 15/026882
DATED : November 20, 2018
INVENTOR(S) : Christoph Englert et al.

Page 1 of 1

It is certified that error appears in the above-identified patent and that said Letters Patent is hereby corrected as shown below:

On the Title Page

- Item (72), please correct the name of the third inventor to read --"Michael GOTTSCHALDT"--

Signed and Sealed this
Eleventh Day of February, 2020

Andrei Iancu
*Director of the United States Patent and Trademark Office*